United States Patent [19]

Kiyohara et al.

[11] Patent Number: 5,686,557
[45] Date of Patent: Nov. 11, 1997

[54] POLYAMIDE RESIN WHICH CAN BE DISSOLVED IN ALCOHOL SOLVENT, COMPOSITION THEREOF, AND METHOD OF USE THEREOF

[75] Inventors: Osamu Kiyohara; Tomohiro Taruishi, both of Shizuoka, Japan

[73] Assignee: Tomoegawa Paper Co., Ltd., Tokyo, Japan

[21] Appl. No.: 530,574

[22] Filed: Sep. 19, 1995

[30] Foreign Application Priority Data

| | | | |
|---|---|---|---|
| Sep. 21, 1994 | [JP] | Japan | 6-227069 |
| Jan. 31, 1995 | [JP] | Japan | 7-032908 |
| Feb. 10, 1995 | [JP] | Japan | 7-023201 |
| Feb. 10, 1995 | [JP] | Japan | 7-044973 |
| Jul. 12, 1995 | [JP] | Japan | 7-197971 |
| Jul. 21, 1995 | [JP] | Japan | 7-186067 |

[51] Int. Cl.$^6$ ............................ C08G 69/08; C08G 73/10
[52] U.S. Cl. ............... 528/310; 582/322; 582/324; 582/331; 582/332; 582/335; 582/347
[58] Field of Search .......................... 528/310, 335, 528/322, 324, 331, 332, 347

[56] References Cited

U.S. PATENT DOCUMENTS

| | | | |
|---|---|---|---|
| 5,310,860 | 5/1994 | Maj et al. | 528/324 |
| 5,364,908 | 11/1994 | Oishi et al | 525/64 |
| 5,385,952 | 1/1995 | Fisback et al. | 521/131 |
| 5,420,167 | 5/1995 | Fishback et al. | 521/168 |

Primary Examiner—James J. Seidleck
Assistant Examiner—P. Hampton-Hightower
Attorney, Agent, or Firm—Oblon, Spivak, McClelland, Maier & Neustadt, P.C.

[57] ABSTRACT

A polyamide resin is disclosed comprising:

a diamine component comprised of at least 50% by mole based on the total diamine component of diamine having diphenyl methane structure substituted by alkyl groups, indicated by the following Formula 1, and a dicarboxylic acid component comprised of at least 50% by mole based on the total dicarboxylic acid component of aromatic dicarboxylic acid having phenolic hydroxyl groups, indicated by the following Formula 2,

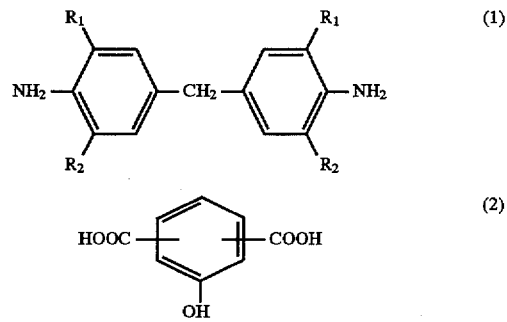

wherein, $R^1$ and $R^2$ are a group or atom selected from the group consisting of a hydrogen atom, a methyl group, an ethyl group, a propyl group, and an isopropyl group, and wherein $R^1$ and $R^2$ are not both hydrogen atoms.

14 Claims, No Drawings

POLYAMIDE RESIN WHICH CAN BE DISSOLVED IN ALCOHOL SOLVENT, COMPOSITION THEREOF, AND METHOD OF USE THEREOF

BACKGROUND OF THE INVENTION

1. Field of the Invention

The present invention relates to polyamide resins and compositions thereof which can be applied in such varied fields as, for example, photosensitive resins, coatings, and adhesives. In particular, the present invention relates to aromatic polyamide resin having a good solubility in solvents and good workability, to compositions thereof which do not dissolve in solvents after processing, and to methods of use thereof.

2. Description of the Related Art

Polyamide resin, in particular aromatic polyamide resins, are thermoplastic resins having excellent mechanical strength, heat resistance and adhesiveness. Therefore polyamide resins have been applied in varied fields such as engineering plastic and electrical parts.

Polyamide resins dissolve in certain solvents, for example, amide solvent having high toxicity, and sulfuric acid. Therefore, process methods for polyamide resins have been limited. A means has been desired which can utilize the aforementioned desirable properties of polyamide resin. By changing the molecular structure of polyamide resin, the solubility and the workability can be improved; however, the thermal resistance and mechanical strength are remarkably decreased.

Composites which have the excellent thermal properties and mechanical strength of polyamide resins and good adhesiveness of epoxy compounds or isocyanate compounds are desired.

Moreover, water soluble resin is easy to handle, and is economical. However, water soluble resin has both a weak mechanical strength and a low thermal resistance. In order to overcome these weak points, investigation of composites with other resin, especially polyamide have been done. However, polyamide resin, in particular aromatic polyamide resin has very low dissolving properties in solvents, especially aqueous solvent. Therefore, it is impossible to make a composite of water soluble resin with polyamide resin, that is, it is not possible to improve the weak points of water soluble resin with polyamide resin.

SUMMARY OF THE INVENTION

Improvements are desired in the workability of polyamide resin, in particular aromatic polyamide resin, while maintaining thermal resistance, film forming properties, adhesiveness, and compatibility. That is, it is desired to produce polyamide resin and composition thereof having good solubility in solvent, which can be easily made into a composite with another component before processing, and which has improved mechanical strength, thermal resistance, film forming properties, and low dissolving properties after processing. Furthermore, modification of another resin using polyamide resin having such good properties is also desired.

According to a first aspect of the present invention, aromatic polyamide resin (hereinafter abbreviated as "polyamide resin (A)") is produced, which can be dissolved in various economical non-toxic solvents.

According to a second aspect of the present invention, a polyamide resin composition is produced which has good workability and reactivity. That is, a polyamide resin composition is produced which is soluble in solvent, can be easily made into a composite with another component before processing, and has improved mechanical strength, thermal resistance, film forming properties, low dissolving properties, and adhesiveness to base materials after processing. Moreover, a method for using polyamide resin composition is provided.

According to a third aspect of the present invention, a polyamide resin composition is provided which has improved thermal properties and mechanical properties of water soluble resin by compositing polyamide resin and water soluble resin.

According to a fourth aspect of the present invention, a photosensitive polyamide resin composition is provided which can be used for electrical parts and semiconductors requiring good adhesiveness, film forming properties, and thermal resistance.

As a result of research for providing polyamide resin, it has been found that polyamide resin, which can be dissolved not only in conventional amide solvents, but also in alcohol solvents, can be prepared by:

a diamine component comprised of at least 50% by mole based on the total diamine component of diamine having diphenylmethane structure substituted by alkyl groups, indicated by the following Formula 1, and a dicarboxylic acid component comprised of at least 50% by mole based on the total dicarboxylic acid component of aromatic dicarboxylic acid having a phenolic hydroxyl group, indicated by the following Formula 2

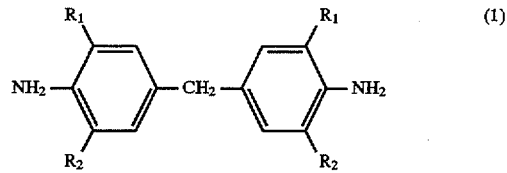

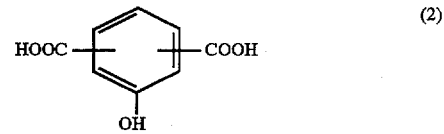

wherein, $R^1$ and $R^2$ are groups or atoms selected from the group consisting of a hydrogen atom, a methyl group, an ethyl group, a propyl group, and an isopropyl group, and wherein $R^1$ and $R^2$ are not both hydrogen atoms.

The aforementioned dissolving properties cannot be predicted from conventional technology.

Polyamide resin (A) of the present invention can be prepared by a diamine component comprised of 50% by mole or greater based on the total diamine component of diamine having diphenylmethane structure substituted by alkyl groups, indicated by the above Formula (1), and a dicarboxyic acid component comprised of 50% by mole or greater based on the total dicarboxylic acid component of aromatic dicarboxylic acid having phenolic hydroxyl group, indicated by the above Formula (2).

The diamine component comprises 50% by mole or greater based on the total diamine component of diamine having diphenylmethane structure substituted by alkyl groups, indicated by the above Formula (1). When the diamine indicated by the above Formula (1) is less than 50% by mole, polyamide resin having good dissolving properties in solvent cannot be prepared, since orientation of the molecule occurs easily. Therefore, the content of the diamine indicated by the above Formula (1) is preferably not less than 50% by mole.

Besides the diamine indicated by the above Formula (1), a diamine (hereinafter abbreviated as "the other diamine") is preferably used when improvement of thermal resistance and/or of dynamic strength is desired.

Diamines having a diphenylmethane structure substituted by alkyl groups, indicated by the above Formula (1), can be exemplified as follows, but not limited to, bis (3-methyl-4-aminophenyl) methane, bis(3-ethyl-4-aminophenyl) methane, bis(3-propyl-4-aminophenyl)methane, bis(3-isopropyl-4-aminophenyl)methane, bis(3,5-dimethyl-4-aminophenyl)methane, bis(3,5-diethyl-4-aminophenyl)methane, bis(3,5-dipropyl-4-aminophenyl)methane, bis(3,5-diisopropyl-4-aminophenyl)methane, bis(3-methyl-5-ethyl-4-aminophenyl)methane, bis(3-methyl-5-propyl-4-aminophenyl)methane, bis(3-methyl-5-isopropyl-4-aminophenyl)methane, bis(3-ethyl-5-propyl-4-aminophenyl)methane, bis(3-ethyl-5-isopropyl-4-aminophenyl)methane, bis(3-propyl-5-isopropyl-4-aminophenyl)methane, and the like.

The other diamines can be exemplified as follows, but not are limited to, m-phenylenediamine, p-phenylenediamine, methatolylene diamine, 4,4'-diaminodiphenyl ether, 3,3'-dimethyl-4,4'-diaminodiphenyl ether, 3,3'-diaminodiphenyl ether, 3,4'-diaminodiphenyl ether, 4,4'-diaminodiphenyl thioether, 3,3'-dimethyl-4,4'-diaminodiphenyl thioether, 3,3'-diethoxy-4,4'-diaminodiphenyl thioether, 3,3'-diaminodiphenyl thioether, 4,4'-diaminobenzophenone, 3,3'-dimethyl-4,4'-diaminobenzophenone, 3,3'-diaminodiphenyl methane, 4,4'-diaminodiphenyl methane, 3,3'-dimethoxy-4,4'-diaminodiphenyl methane, 2,2-bis(3-aminophenyl) propane, 2,2-bis(4-aminophenyl)propane, 4,4'-diaminodiphenyl sulfoxide, 4,4'-diaminodiphenyl sulfone, benzidine, 3,3'-dimethyl benzidine, 3,3'-dimethoxybenzidine, 3,3'-diaminobiphenyl, p-xylenediamine, m-xylenediamine, 2,2-bis(3-amino-4-hydroxyphenyl) hexafluoropropane, 1,4-diamino naphthalene, 1,5-diamino naphthalene, 2,6-diamino naphthalene, 1,4-bis(p-aminophenyl isopropylidine) benzene, 1,3-bis(p-aminophenyl isopropylidine)benzene, 1,3-bis(p-aminophenoxy)benzene, 2,2-bis(3-amino-4-hydroxyphenyl)propane, 2,2-bis(3-hydroxy-4-aminophenyl)propane, and a combination of one or more of these compounds.

The dicarboxylic acid component comprises 50% by mole or greater based of the total dicarboxylic acid component of aromatic dicarboxylic acid having phenolic hydroxyl groups, indicated by the above Formula (2). When the dicarboxylic acid indicated by the above Formula (2) is less than 50% by mole, a polyamide resin having good dissolving properties in solvent cannot be prepared. Therefore, the content of the dicarboxylic acid indicated by the above Formula (2) is preferably not less than 50% by mole.

Besides the dicarboxylic acids indicated by the above Formula (2), dicarboxylic acids (hereinafter abbreviated as "the other dicarboxylic acids") are preferably used when improved thermal stability is desired.

Dicarboxylic acids indicated by the above Formula (2) include, 5-hydroxyisophthalic acid, 4-hydroxyisophthalic acid, 2-hydroxyphthalic acid, 3-hydroxyphthalic acid, and 2-hydroxyterephthalic acid.

The other dicarboxylic acids include, but are not limited to, phthalic acid, isophthalic acid, terephthalic acid, 4,4'-biphenyl dicarboxylic acid, 3,3'-methylene dibenzoic acid, 4,4'-oxydibenzoic acid, 4,4'-carbonyl dibenzoic acid, 4,4'-sulfonyl dibenzoic acid, 1,4-naphthalene dicarboxylic acid, 1,5-naphthalene dicarboxylic acid, 2,6-naphthalene dicarboxylic acid, ethylene diamine bisphthalimide-4,4'-dicarboxylic acid, 2,2-bis(4-carboxyphenyl) propane, 2,2-bis(4-carboxyphenyl) hexafluoro dicarboxylic acid, 1,3-cyclohexane dicarboxylic acid, 1,4-cyclohexane dicarboxylic acid, and combinations thereof.

Polyamide resin (A) of the present invention can be easily prepared by condensing said diamine component and dicarboxylic acid component. In preparing polyamide resin (A), traditional preparing methods can be performed, which are for example, traditional methods such as a solid phase polycondensation method, an acid-chloride method, an activated esterification method, a directing method using a condensing agent, and the like. In particular, a directing method using a condensing agent is preferable, since it is not necessary to protect the hydroxyl group of the dicarboxylic acid. The directing method which is disclosed in U.S. Pat. No. 5,342,895 by T. Tagami, et. al. is preferable.

The condensing agents which can be used in the directing method include, but are not limited to, a phosphite-pyridine activated agent, a phosphite-metal salt activated agent, a triphenyl phosphine-hexachloroethane activated agent, a phosphorus chloride, a phosphoric acid anhydride, a phosphorate, a phosphoramide, a thionyl chloride, and the like. In particular, phosphite-pyridine activated agent is preferable, since the agent is easy to handle, and is economical.

Polyamide resin (A) of the present invention can be easily prepared by stirring a solution containing diamine and dicarboxylic acid components and amide solvent such as N-methyl-2-pyrrolidone or N,N-dimethyl acetamide when the condensing agent is used, under an inert gas such as nitrogen gas, at a temperature in the range of room temperature to 160° C., for 30 minutes to a few hours. Lithium chloride or calcium chloride can be added as a reaction accelerator in the reaction system.

The preferable polyamide resin has an average degree of polymerization range of 2 to 1000, preferably 10 to 500, and 0.1 to 4.0 g/dl, preferably 0.3 to 1.0 g/dl of the intrinsic viscosity (measured by 0.5 g/dl of N,N-dimethyl acetamide solvent at 30° C.). When the intrinsic viscosity is less than 0.1 g/dl, it becomes too difficult to prepare film having good mechanical strength, since the average degree of polymerization thereof is not sufficient. When the intrinsic viscosity is more than 4.0 g/dl, the solubility in the solvent becomes worse, since the degree of polymerization thereof is too large.

The average degree of polymerization of the prepared polyamide resin (A) can be easily controlled by controlling the amount of diamine component and dicarboxylic acid component used. Specifically, by adding an excess amount of diamine component or dicarboxylic acid component, the average degree of polymerization of polyamide resin (A) becomes small.

Polyamide resin (A) composition, and films prepared from the composition thereof of the present invention will be explained hereinbelow.

Polyamide resin (A) of the present invention can be dissolved not only in conventional solvents such as sulfuric acid, formamide, N-methyl formamide, N,N-dimethyl formamide, acetamide, N-methyl acetamide, N,N-dimethyl acetamide, N-methyl propioamide, 1,1,3,3-tetramethyl urea, 2-pyrrolidone, N-methyl-2-pyrrolidone, N,N'-dimethyl-2-imidazolidinone, and the like, but also in alcohol solvent (B).

Alcohol solvents (B) are organic solvents which have more than one hydroxyl group, and are liquid in the temperature range of 0° to 200° C. Alcohol solvents (B) may have ether bonds, halogen groups, cyano groups, nitro groups, amino groups, amide groups, and ester bonds in their structure.

Alcohol solvents (B) include, but are not limited to, methanol, ethanol, propanol, isopropanol, butanol, sec-butanon, isobutanol, 1-pentanol, 2-pentanol, 3-pentanol, 2-methyl-1-butanol, 3-methyl-1-butanol, 2-methyl-2-butanol, 3-methyl-2-butanol, 2,2-dimethyl-1-propanol, cyclohexanol, 1-hexanol, 2-methyl-1-pentanol, 4-methyl-2-pentanol, 2-ethyl-1-butanol, 1-octanol, 2-ethyl-1-hexanol, benzylalcohol, m-creosol, 2-penten-1-ol, cis-2-buten-1-ol, propargyl alcohol, ethylene glycol, propylene glycol, trimethylene glycol, 1,3-butanediol, glycerin, methyl cellosolve, ethyl cellosolve, butyl cellosolve, diethylene glycol, triethylene glycol, 2-(2-methoxyethoxy) ethanol, and the like.

Polyamide resins (A) of the present invention can be easily dissolved in alcohol solvents (D) having 1–5 carbon atoms, and are more easily dissolved in linear alcohol solvents such as methanol, ethanol, propanol, butanol, and pentanol which are more preferable.

Among linear alcohol solvents, polyamide resin (A) of the present invention can be most easily dissolved in alcohol solvents (E) which have ether bonds in their structure among linear alcohol solvents.

Alcohol solvents (E) having ether bond in their structures include, but are not limited to, methyl cellosolve, ethyl cellosolve, butyl cellosolve, and the like.

Moreover, polyamide resins (A) of the present invention can hardly dissolve or cannot dissolve perfectly in organic solvents (C) such as ester solvents, ketone solvents, halogenated solvents, nitro solvents, nitrile solvents, amine solvents, ether solvents, aromatic solvents, aliphatic solvents, and the like.

However, polyamide resins (A) have good dissolving properties in mixture of solvents comprising an organic solvent (C) and an alcohol solvent (B). This surprising dissolving behavior widens the application range of polyamide resin.

Ester solvents are organic solvents having more than one ester bond in their structure other than alcohol solvents and the amide solvents. The ester solvents may have carbonyl groups, ether bonds, halogen groups, cyano groups, nitro groups, and amino groups.

The ester solvents include, but are not limited to, methyl formate, ethyl formate, butyl formate, methyl acetate, ethyl acetate, propyl acetate, butyl acetate, amyl acetate, ethyleneglycol-diacetic acid, benzyl acetate, ethyl propionate, isobutyl isobutyrate, ethyl isovalerate, butyl stearate, ethyleneglycol monoethylene ether acetate, ethyleneglycol monomethylene ester acetate and the like. Among the ester solvents, ethyl acetate, ethyl propionate, and isobutyl isobutyrate are more preferable.

Ketone solvents are organic solvents having more than one carbonyl group in their structure other than alcohol, amide, and ester solvents. The ketone solvents may have carboxyl groups, ether bonds, halogen groups, cyano groups, nitro groups, amino groups, amide groups, and ester groups.

The ketone solvents include, but are not limited to, acetone, methyl ethyl ketone, diethyl ketone, methyl isobutyl ketone, cyclohexanone, and the like. Among the ketone solvents, acetone, methyl ethyl ketone, methyl isobutyl ketone, and cyclohexanone are preferable.

Halogen solvents are organic solvents having more than one halogen atom in their structure other than alcohol, amide, ester, ketone solvents. The halogen solvents may have ether bonds, cyano groups, nitro groups, and amino groups.

The halogen solvents include, but are not limited to, fluorobenzene, o-fluorotoluene, m-fluorotoluene, p-fluorotoluene, hexafluorobenzene, hexachloroethane, 1,1,2,2-tetrachloro difluoroethane, 1,2-dibromo tetrafluoroethane, chloroethane, 1-chloropropane, 2-chloropropane, 1-chlorobutane, 2-chlorobutane, 1-chloro-2-methylpropane, chloro-2-methylpropane, 1-chloropentane, chlorobenzene, 1-chloronaphthalene, dichloromethane, chloroform, carbon tetrachloride, 1,1-dichloroethane, 1,2-dichloroethane, 1,1,1-trichloroethane, 1,1,2,2-tetrachloroethane, pentachloroethane, o-dichlorobenzene, m-dichlorobenzene, 3-chloropropene, 1,1-dichloroethylene, cis-1,2-dichloroethylene, trans-1,2-dichloroethylene, trichloroethylene, tetrachloroethylene, bromobenzene, bromoform, 1,2-dibromoethane, 1,1,2,2-tetrabromoethane, and the like.

Nitro solvents are organic solvents having more than one nitro group in their structure other than alcohol, amide, ester, ketone, and halogen solvents. The nitro solvents may have ether bonds, cyano groups, and amino groups.

The nitro solvents include, but are not limited to, nitromethane, nitroethane, 1-nitropropane, 2-nitropropane, nitrobenzene, o-nitroanisole, and the like.

Nitrile solvents are organic solvents having more than one cyano group in their structure other than alcohol, amide, ester, ketone, halogen, and nitro solvents. The nitryl solvents may have ether bonds, and amino groups.

The nitrile solvents include, but are not limited to, acetonitrile, propionitrile, butylonitrile, isobutylonitrile, valeronitrile, a-tolunitrile, benzonitrile, and the like.

Amine solvents are organic solvents having more than one nitrogen atom in their structure other than alcohol, amide, ester, ketone, halogen, nitro, and nitrile solvents. The amine solvents may have ether bonds.

The amine solvents include, but are not limited to, propylamine, isopropylamine, butylamine, isobutylamine, sec-butylamine, tert-butylamine, cyclohexylamine, aniline, m-toluidine, ethylenediamine, diethylamine, dipropylamine, diisopropylamine, dibutylamine, pyrrole, piperidine, triethylamine, pyridine, quinoline, and the like.

Ether solvents are the organic solvents having more than one oxygen atom in their structure other than alcohol, amide, ester, ketone, halogen, nitro, and nitrile solvents.

The ether solvents include, but are not limited to, diethylether, dipropylether, diisopropylether, dibutylether, butylether, pentylether, monogrime, digrime, furan, tetrahydrofuran, dioxane, tetrahydropyran, benzylethylether, anisole, dibenzylether, and the like.

Aromatic solvents are organic solvents having more than one aromatic ring in their structure other than alcohol, amide, ester, ketone, halogen, nitro, nitrile, and ether solvents.

The aromatic solvents include, but are not limited to, benzene, toluene, o-xylene, m-xylene, p-xylene, ethylbenzene, mesitylene, tetralin, sec-butylbenzene, p-cumene, and the like.

Aliphatic solvents are organic solvents other than alcohol, amide, ester, ketone, halogen, nitro, nitrile, ether, and aromatic solvents.

The aliphatic solvents include, but are not limited to, cyclopentane, pentane, isopentane, neopentane, methylcyclopentane, cyclohexane, hexane, 2-methylpentane, 3-methylpentane, 2,2-dimethylbutane, 2,3-dimethylbutane, methylcyclohexane, heptane, 2-methylhexane, 3-methylhexane, 2,3-dimethylpentane, 2,4-dimethylpentane, ethylcyclohexane, octane, 2,2,3-trimethylpentane, 2,2,4-trimethylpentane, nonane, trimethylhexane, decaline, decane, bicyclohexyldodecane, and the like.

The mixture solvent comprises alcohol solvent (B) and organic solvent (C). The mixing ratio of alcohol solvent (B) and organic solvent (C) has no restriction as long as alcohol solvent (B) and organic solvent (C) are compatible with each other; moreover, alcohol solvent (B) and organic solvent (C) are made compatible by the polyamide resin of the present invention even if they are usually non-compatible with each other.

Besides the organic solvent (C), polyamide resin (A) of the present invention can be also dissolved in alkali aqueous solvents (F) containing alcohol. Alcohol solvents which can be added to the alkali aqueous solvent (F) are the above-mentioned alcohol solvents, in particular alcohol solvent (D) is preferable.

The alkalinizing agents include, but are not limited to, potassium hydroxide, sodium hydroxide, sodium carbonate, tetramethylammonium hydroxide, hydrazine, and the like.

The content of alcohol and the concentration of alkali can be optionally chosen with consideration of the amounts of hydroxyl groups in polyamide resin (A). However, the content of alcohol is preferably 30% by weight or greater, and the concentration of alkali is preferably 0.05% by weight or greater, based on the total weight of the solvent. When the content of alcohol is less than 30% by weight, the dissolving property of polyamide resin (A) of the present invention becomes unacceptable. When the concentration of alkali is less than 0.05% by weight, the dissolving property of polyamide resin (A) of the present invention becomes similarly to unacceptable.

As explained above, polyamide resin (A) of the present invention can easily solve in alkali aqueous solvent (F) containing alcohol, therefore water soluble resin (L) and polyamide resin (A) can be easily mixed through the alkali aqueous solvent (F) containing alcohol.

The water soluble resins (L) are resins which can be dissolved in alkali aqueous solvents (F) containing alcohol.

The water soluble resins (L) include, but are not limited to, water soluble phenol resin, aqueous alkyd resin, water soluble cellulose resin such as carboxymethyl cellulose, methyl cellulose, hydroxyethyl cellulose, and hydroxypropyl cellulose, water soluble polyvinyl alcohol resin, water soluble denatured polyvinyl alcohol resin, water soluble poly(hydroxybuthylate) resin, carboxymethyl starch, hydroxyethyl starch, denatured starch, carboxylic denatured butyral resin, and the like.

Moreover, a stable composite comprising polyamide resin (A) and water soluble resin (L) can be prepared by cross linking hydroxyl groups of polyamide resin (A) and hydroxyl groups of water soluble resin (L).

A crosslinking agents used for crosslinking the water soluble resin (L) and polyamide resin (A) are preferable to a water soluble epoxy resin (J) having 2 or more epoxy groups in their structure.

The water soluble epoxy resins (J) include, but are not limited to, sorbitol polyglycydylether, polyglycerol polyglycydylether, pentaerythritol polyglycydylether, diglycerol polyglycydylether, triglycydyl tris(hydroxyethyl) isocyanurate, glycerol polyglycydylether, trimethylolpropane polyglycydylether, neopenthylglycol diglycydylether, ethylene polyethyleneglycol diglycydylether, propylene polypropyleneglycol diglycydylether, adipic acid diglycydylether, polyethyleneglycol #200 diglycydylether, polyethyleneglycol #400 diglycydylether, Epolight 200E-acrylic acid addition product, and the like.

Polyamide resin (A) of the present invention can be easily reacted with compounds having isocyanate groups and epoxy groups, since polyamide resin (A) has a reactive and stable phenolic hydroxyl group. Therefore, the composite can be prepared, which cannot only improve resistance to solvents, but also have good adhesiveness to base materials.

Polyamide resin composite of the present invention can be applied to surface protective agents, coating agents, adhesive materials, sealing compounds, and the like.

The resin coats of the present invention can be prepared by adding a crosslinking agent to the resin composition, making coats (coating, drying), and facilitating crosslinking reaction by heating.

The resin coats of the present invention have inferior resistance to solvents, since polyamide resin (A) comprising the resin coats has good dissolving properties in solvents. However, this weakness of the resin coats can be improved by polymerizing, that is, crosslinking.

The crosslinking agent includes the epoxy compounds (G) which have two or more epoxy groups in their structure, or the isocyanate compounds (H) which have a blocking isocyanate group. When these crosslinking agents are used, ether bonds, hydroxyl groups, or urethane bonds are prepared. These bonds, in particular urethane bonds, have flexibility; therefore the adhesiveness and the adhesion of the resin coats of the present invention to base material can be improved. These crosslinking agents and polyamide resin (A) react at less than 250° C., for a few hours. Moreover, these compounds also react at room temperature. The conditions of the reaction are not restricted in the present invention.

The coats which are waterproof can be prepared by using the composition comprised of polyamide resin (A), water soluble resin (L), and the crosslinking agent (H) or (G).

Any epoxy compound (G) as shown in the crosslinking agent will do, as long as it can be dissolved in polyamide resin (A) compositions. However, compounds having polyfunctional group are preferable, such as glycydylethers, glycydylesters, glycydylamines, linear aliphatic epoxide compounds, alicyclic epoxide compounds, hydantoin type epoxy compounds, and the like.

The glycydylethers include glycydylethers of biphenyl, glycydylethers of bisphenol, polyglycydylethers of phenolnovolak, polyphenylol type glycydylethers, alkyleneglycols, diglycydylethers of polyalkyleneglycoi, naphthalene diglycydylethers, and the like.

Specifically, the glycydylethers of bisphenol include diglycydylethers of diphenol such as bisphenol A, bisphenol F, bisphenol AD, bisphenol S, tetramethylbisphenol A, tetramethylbisphenol F, tetramethylbisphenol AD, tetramethylbisphenol S, tetrachlorobisphenol A, tetrabromobisphenol A and the like.

The polyglycydylethers of phenolnovolak include, phenolnovolak, cresolnovolak, brominated phenolnovolak, orthocresolnovolak, and the like.

The polyphenol type glycydylethers, alkyleneglycol, and diglycydylethers of polyalkylglycol include diglycydylethers of glycol such as polyethyleneglycol, polypropyleneglycol, butandiol, and the like.

The glycydylesters include glycydylesters of hexahydrophthalic acid, glycydylester of dimeric acid, and the like.

The glycydylamines include triglycydylaminodiphenylmethane, triglycydylaminophenol, triglycydylisocyanate, and the like.

The linear aliphatic epoxides include epoxidated polybutadiene, epoxidated soybean oil, and the like.

The alicyclic epoxides include 3,4-epoxy-6-methylcyclohexylmethylcarboxylate, 3,4-epoxycyclohexylmethylcarboxylate, hydrogenated bisphenolepoxy, and the like.

The hydantoin type epoxy compounds include diglycydylhydantoin, glycydylglycydeoxyalkylhydantoin, polyfunctional epoxy compounds based tris(hydroxyphenyl) methane, tetraglycydyloxyphenylsulfone, biphenylnovolak type glycydylethers, and the like.

These epoxide compounds (G) are some of the epoxide compounds which used in the present invention, and the range is not limited to them.

The amount of the epoxy compounds (G) added is dependent upon the concentration of hydroxyl group of polyamide resin (A). That is, epoxy compounds (G) can be added so that the concentration of epoxy group is less than the concentration of hydroxyl groups. When the epoxy compounds (G) is added so that the concentration of epoxy groups is greater than the hydroxyl groups, the possibility that epoxy groups will come into contact with each other increases, and epoxy groups easily react with each other. As a result, coats having good thermal resistance and mechanical strength cannot be prepared.

The reaction accelerator may be used in the crosslinking reaction of the epoxy compounds (G) and polyamide resin (A). The reaction accelerators include phosphorus compounds, tertiary amine compounds, boron compounds, mixture thereof, and the like.

The phosphorus compounds include triphenylphosphine.

The tertiary amine compounds include triethylamine, triethanolamine, 1,8-diazabicyclo [5.4.0]-7-undecene (DBU), N,N-dimethylbenzylamine, 1,1,3,3-tetramethylguanidine, 2-ethyl-4-methyimidazol, N-methypiperazine, and the like.

The boron compounds include 1,8-diazabicyclo [5.4.0]-7-undeceniumtetraphenylborate, and the like.

Polyamide resin (A) and epoxy compounds (G) may react at the composition state, or coating state on base material. Therefore, the polyamide resin composite includes products prepared in the reaction of epoxy compounds (G).

The blocking isocyanate compounds (H) include compounds having at least two isocyanate groups being blocked by a blocking agent in the structure, such as aliphatic isocyanate, alicyclic isocyanate, aromatic isocyanate, aromatic aliphatic isocyanate, and the like.

The aliphatic isocyanates include hexamethylenediisocyanate (HDI), trimethylhexamethylene diisocyanate (TMDI), lydine diisocyanate (LDI), and the like.

The alicyclic isocyanates include dicyclohexylmethane diisocyanate (HMDI), isophorone diisocyanate (IPDI), 1,4-cyclohexane diisocyanate (CHDI), hydrogenated xylenediisocyanate (HXDI), hydrogenated trilene diisocyanate (HTDI), and the like.

The aromatic isocyanates include tolylene diisocyanate (TDI), 4,4'-diphenylmethane diisocyanate, 2,4-diphenylmethane diisocyanate (MDI), naphthalene diisocyanate (NDI), xylilene diisocyanate (XDI), tridine diisocyanate (TODI), p-phenylene diisocyanate (PPDI), and the like.

The aromatic aliphatic isocyanate compounds include α, α, α', α'-tetramethylxylenediisocyanate (TMXDI), and the like.

The blocking agents include oxime compounds, lactam compounds, alkylphenol compounds, dialkylphenol compounds, trialkylphenol compounds, activated methylene compounds, acetylacetone, acetoacetates, alcohols, ethers having hydroxyl groups, esters having hydroxyl groups, mercaptans, acid amides, imidazols, acid imides, and the like.

The ratio of blocking isocyanate compounds (H) and polyamide resin (A) is not restricted. However, a preferable ratio is one in which the concentration of the isocyanate groups of the blocking isocyanate compounds (H) is less than the concentration of the hydroxyl groups of polyamide resin, specifically 1 to 80% by mole of the isocyanate groups based on 100% by mole of the hydroxyl groups of polyamide resin. When the concentration of the isocyanate groups is greater than 80 % by mole, not only does the density of crosslinking becomes too high, and the resin composite become brittle, but also the possibility of inactive isocyanate occurring becomes high. In contrast, when the concentration of isocyanate groups is less than 1% by mole, it is difficult to obtain effective crosslinking.

When the composition comprising blocking isocyanate compounds (H) and polyamide resin (A) is used as solution by dissolving it in solvent, the concentration of the composition over the solvent is not restricted in the present invention. It is possible to choose the kind of solvent and component concentration depending upon the viscosity of solution.

In order to increase reaction speed, the polyamide resin composition of the present invention can comprise dissociating catalysts for blocking agents.

The dissociating catalysts for blocking agents include organotin compounds such as dibutyltin dilaurate, dibutyltin dimaleate, dioctyltin dimaleate, bis(2-ethylhexyl)tin oxide, 1,1,3,3-tetrabutyl-1,3-diacetoxydistanoxane, and organic potassium or sodium metal salt such as alkyl sulfate, alkyl phosphonate, sodium, potassium, nickel, cobalt, cadmium, barium, calcium, and zinc salts of fatty acids having 8 to 20 carbon atoms, combinations thereof, and the like.

The amount of the dissociating catalysts for blocking agents is typically 0.05 to 10 parts, more preferably 0.01 to 5 parts based on 100 parts of blocking isocyanate compounds. When the amount of dissociating catalysts for blocking agents is less than 0.05 parts, the blocking agent cannot be sufficiently dissociated. In contrast, when the amount is more than 10 parts, the blocking agent dissociates exceedingly.

A composition comprised of polyamide resin (A), alkali aqueous solution, photosensitive naphtoquinonediazide compounds (K) may be used for making patterns.

The photosensitive naphtoquinonediazide compounds (K) which are difficult to dissolve in alkali aqueous solvents before exposure to light, can be easily dissociated in carboxylic acid, and dissolve in alkali aqueous solvent after exposure to light. The naphtoquinonediazide compounds (K) having such functions act as controlling agents for dissolving properties.

The photosensitive naphtoquinonediazides (K) include, but are not limited to, ethyl 1,2-naphthoquinone-2-diazide-5-sulfonate, methyl 1,2-naphthoquinone-2-diazide-5-sulfonate, naphthyl 1,2-naphthoquinone-2-diazide-5-sulfonate, 1,2-naphthoquinone-2-diazide-5-sulfonamide, cyclohexyl 1,2-naphthoquinone-2-diazide-5-sulfonate, tolyl 1,2-naphthoquinone-2-diazide-5-sulfonate, N'-cyclohexylcarbonylhydrazyl 1,2-naphthoquinone-2-diazide-5-sulfonate, 2,4-dimethylpyrazolyl 1,2-naphthoquinone-2-diazide-5-sulfonate, 1,2-naphthoquinone-2-diazide-5-phenylsulfone, 2-(1,2-naphthoquinone-2-diazide-5-sulfonyloxy)-1-hydroxyanthraquinone, and the like (Editor: J.Kosar, "Light-Sensitive Systems", John Wiley & Sons, Inc., 1965).

Among the above photosensitive naphtoquinonediazides (K), the compounds prepared by naphtoquinonediazide compounds and hydroxybenzophenone ester are preferable, since the compounds have high photosensitivity.

The naphtoquinonediazide compounds include halide naphthoquinonediazide sulfonate, specifically halide naphthoquinone-1,2-diazide-3-sulfonate, halide naphthoquinone-1,2-diazide-4-sulfonate, halide naphthoquinone-1,2-diazide-5-sulfonate, halide naphthoquinone-1,2-diazide-6-sulfonate, and the like. The halides used for the naphtoquinonediazide compounds are chlorine, bromine, iodine, and the like.

The hydroxylbenzophenones include 2-hydroxybenzophenone, 3-hydroxybenzophenone, 4-hydroxybenzophenone, 2,3-dihydroxybenzophenone, 2,4-dihydroxybenzophenone, 2,5-dihydroxybenzophenone, 2,6-dihydroxybenzophenone, 2,2'-dihydroxybenzophenone, 2,3'-dihydroxybenzophenone, 2,4'-dihydroxybenzophenone, 3,4-dihydroxybenzophenone, 3,5-dihydroxybenzophenone, 3,3'-dihydroxybenzophenone, 3,4'-dihydroxybenzophenone, 4,4'-dihydroxybenzophenone, 2,3,4-trihydroxybenzophenone, 2,3,5-trihydroxybenzophenone, 2,3,6-trihydroxybenzophenone, 2,2',3-trihydroxybenzophenone, 2,3,3'-trihydroxybenzophenone, 2,3,4'-trihydroxybenzophenone, 2,4,5-trihydroxybenzophenone, 2,4,6-trihydroxybenzophenone, 2,2',4-trihydroxybenzophenone, 2,3',4-trihydroxybenzophenone, 2,4,4'-trihydroxybenzophenone, 2,5,6-trihydroxybenzophenone, 2,2',5-trihydroxybenzophenone, 2,3',5-trihydroxybenzophenone, 2,4',5-trihydroxybenzophenone, 2,2',6-trihydroxybenzophenone, 2,3',6-trihydroxybenzophenone, 2,4',6-trihydroxybenzophenone, 3,4,5-trihydroxybenzophenone, 3,3',4-trihydroxybenzophenone, 3,3',5-trihydroxybenzophenone, 3,4,4'-trihydroxybenzophenone, 2,3,4,5-tetrahydroxybenzophenone, 2,3,4,6-tetrahydroxybenzophenone, 2,2',3,3'-tetrahydroxybenzophenone, 2,2',3,4'-tetrahydroxybenzophenone, 2,2',3,5'-tetrahydroxybenzophenone, 2,2',3,6'-tetrahydroxybenzophenone, 2,3,3',5-tetrahydroxybenzophenone, 2,2',4,4'-tetrahydroxybenzophenone, 2,2',4,5'-tetrahydroxybenzophenone, 2,2',4,6'-tetrahydroxybenzophenone, 2,3,4,4'-tetrahydroxybenzophenone, 2,3',4,5'-tetrahydroxybenzophenone, 2,2',5,5'-tetrahydroxybenzophenone, 2,2',5,6'-tetrahydroxybenzophenone, 2,3',4',5-tetrahydroxybenzophenone, 2,3',5,5'-tetrahydroxybenzophenone, 2,2',6,6'-tetrahydroxybenzophenone, 2,3',4',6-tetrahydroxybenzophenone, 2,3',5',6-tetrahydroxybenzophenone, 3,3',4,4'-tetrahydroxybenzophenone, 3,3',4,5'-tetrahydroxybenzophenone, 3,3',5,5'-tetrahydroxybenzophenone, and the like.

The amount of the naphtoquinonediazide compounds (K) is 0.1 to 70% by weight, more preferably 0.5 to 50% by weight, based on the total solid component of the obtained composition. When the amount is less than 0.1% by weight, it is difficult to obtain sufficient photosensitivity. In contrast, when the amount is more than 70% by weight, it is difficult to obtain a uniform resist film, and after developing or etching the residual cannot be completely removed.

The alkali aqueous solvents include inorganic alkali aqueous solvents such as potassium hydroxide, sodium hydroxide, sodium carbonate, and sodium silicate, and organic alkali aqueous solvents such as tetramethylammonium hydroxide, and trimethylammonium hydroxide.

In order to improve the solubility of the polyamide resin (A) of the present invention, it is possible to add an alkali aqueous solvent (F) which comprise an alcohol. More alcohol may be added to the alkali aqueous solvent (F) to increase the solubility of the polyamide resin (A) of the present invention.

The obtained photosensitive resin composition can also dissolve in organic solvents.

The organic solvents include cyclohexanone; ketones such as acetone, methyethylketone, and methylisobutylketone; cellosolves such as methylcellosolve, methyl cellosolve acetate, ethyl cellosolve, ethyl cellosolve acetate, buty cellosolve, and butyl cellosolve acetate; esters such as ethyl acetate, butyl acetate, isoamyl acetate, and methyl lactate; alcohols such as methanol, ethanol, propanol, butanol, pentanol, and octanol; N-methyl-2-pyrrolidone; N,N-dimethyl acetamide; N,N-dimethylformamide; dimethylsulfoxide; 1,4-dioxane; tetrahydrofuran; and combinations thereof.

Moreover, the coats obtained by the applying and drying of photosensitive resin compositions comprised of photosensitive naphtoquinonediazide compounds (K) are difficult to dissolve in alkali aqueous solvent before exposing to light, however they dissolve easily after exposure to light.

As explained above, the following additives can be added to the polyamide resin compositions of the present invention.

The additives include natural waxes; synthetic waxes; long chain aliphatic acids and metallic salts thereof; acid amides; esters; moled releasing agent such as paraffins; silicone rubbers; nitrile rubbers; butadiene rubbers; stress relaxation agents such as polysiloxane; flame retardants such as chlorinated paraffins, bromotoluene, hexabromobenzene; antimony trioxide coupling agent such as silanes, titanates, and aluminums; fillers such as fused silica, crystalline silica, glass flake, glass beads, glass balloon, talc, alumina, calcium silicate, calcium carbonate, barium sulfate, magnesia, silicon nitride, boron nitride, ferrite, and rare earth cobalt; inorganic conductive materials such as gold, silver, nickel, copper, zinc, tin, iron powder, iron oxide, and magnetite sand; electrical polymer; color agents such as dye and pigments; oxidation stabilizers; light stabilizers; moisture-proof improving agents, thixotropy applying agents; diluents; antiforming agents; liquid resins, and solid resins.

DETAILED DESCRIPTION OF THE PREFERRED EMBODIMENTS

Polyamide resin (A), compositions thereof, and methods of use thereof of the present invention will be explained in detail hereinbelow with reference to examples. In the examples, all "parts" designate "parts by weight".

First, polyamide resin (A) was prepared in Synthetic Examples 1 to 7.

Synthetic Example 1

In to a 200 ml-flask having a round bottom and three openings to which a mechanical stirrer, a reflux condenser, a tube filled with calcium chloride, and tube for introducing nitrogen gas are attached, 3.642 g (20 milli mole) of 5-hydroxyisophthalic acid, 6,029 g (20 milli mole) of 3,3', 5,5'-tetraethyl-4,4'-diaminodiphenylmethane, 2.02 g of calcium chloride, 0.66 g of lithium chloride, 120 ml of N-methyl-2-pyrrolidone, 6 ml of pyridine, and 12.41 g (40 milli mole) of triphenyl phosphite are added. Then, the mixture was stirred under nitrogen atmosphere, at 120° C., for 4 hours. After cooling the reacted solution to room temperature, the reacted solution was added to the depositing mixture solution comprised of methanol and distilled water. The polyamide resin (A) was prepared by washing the obtained resin composition with the mixture solvent comprised of methanol and distilled water.

The yield of polyamide resin was 91%, and the intrinsic viscosity (N,N-dimethylacetamide solvent, 30° C.) thereof was 0.60 dl/g.

Synthetic Example 2

Polyamide resin (A) was prepared in a manner identical to that of Synthetic Example 1, except that 3.642 g (20 milli mole) of 5-hydroxyisophthalic acid was replaced by 2.732 g (15 milli mole) of 5-hydroxyisophthalic acid and 0.831 g (5 milli mole) of isophthalic acid.

The yield of polyamide resin was 93%, and the intrinsic viscosity (N,N-dimethylacetamide solvent, 30° C.) thereof was 0.62 dl/g.

Synthetic Example 3

Polyamide resin (A) was prepared in a manner identical to that of Synthetic Example 1, except that 3.642 g (20 milli mole) of 5-hydroxyisophthalic acid was replaced by 2.186 g (12 milli mole) of 5-hydroxyisophthalic acid and 1.329 g (8 milli mole) of isophthalic acid.

The yield of polyamide resin was 94%, and intrinsic viscosity (N,N-dimethylacetamide solvent, 30° C.) thereof was 0.64 dl/g.

Synthetic Example 4

Polyamide resin (A) was prepared in a manner identical to that of Synthetic Example 1, except that 6.209 g (20 milli mole) of 3,3',5,5'-tetraethyl-4,4'-diaminodiphenylmethane was replaced by 5.728 g (20 milli mole) of 3,3'-diethyl-4,4'-diamino-5,5'-dimethydiphenyl methane.

The yield of polyamide resin was 92%, and intrinsic viscosity (N,N-dimethylacetamide solvent, 30° C.) thereof was 0.59 dl/g.

Synthetic Example 5

Polyamide resin (A) was prepared in a manner identical to that of Synthetic Example 4, except that 3.642 g (20 milli mole) of 5-hydroxyisophthalic acid was replaced by 2.732 g (15 milli mole) of 5-hydroxyisophthalic acid and 0.831 g (5 milli mole) of isophthalic acid.

The yield of polyamide resin was 93%, and intrinsic viscosity (N,N-dimethylacetamide solvent, 30° C.) thereof was 0.60 dl/g.

Synthetic Example 6

Polyamide resin (A) was prepared in a manner identical to that of Synthetic Example 1, except that 6.209 g (20 milli mole) of 3,3',5,5'-tetraethyl-4,4'-diaminodiphenylmethane was replaced by 5.007 g (20 milli mole) of 3,3',5,5'-tetramethyl-4,4'-diaminodiphenylmethane.

The yield of polyamide resin was 92%, and intrinsic viscosity (N,N-dimethylacetamide solvent, 30° C.) thereof was 0.62 dl/g.

Synthetic Example 7

Polyamide resin (A) was prepared in a manner identical to that of Synthetic Example 8, except that 3.842 g (20 milli mole) of 5-hydroxyisophthalic acid was replaced by 2.732 g (15 milli mole) of 5-hydroxyisophthalic acid and 0.831 g (5 milli mole) of isophthalic acid.

The yield of polyamide resin was 93%, and intrinsic viscosity (N,N-dimethylacetamide solvent, 30° C.) thereof was 0.58 dl/g.

Example 1

The transparent resin compositions (I) (resin content: 5% by weight) were respectively obtained by adding 19 g of ethanol to 1 g of polyamide resins prepared in the above Synthetic Examples 1 to 7.

Example 2

The transparent resin compositions (II) (resin content: 10% by weight) were respectively obtained by adding 9 g of n-butanol to 1 g of polyamide resins prepared in the above Synthetic Examples 1 to 7.

Example 3

The transparent resin compositions (III) (resin content: 10% by weight) were respectively obtained by adding 18 g of mix solvent comprised of 9 g of methanol and 9 g of chloroform to 2 g of polyamide resins prepared in the above Synthetic Examples 1 to 7.

Example 4

The transparent resin compositions (IV) (resin content: 10% by weight) were respectively obtained by adding 18 g of mix solvent comprised of 9 g of methanol and 9 g of toluene to 2 g of polyamide resins prepared in the above Synthetic Examples 1 to 7.

Example 5

The transparent resin compositions (V) (resin content: 10% by weight) were respectively obtained by adding 18 g of mix solvent comprised of 9 g of methanol and 9 g of methylethyl ketone to 2 g of polyamide resins prepared in the above Synthetic Examples 1 to 7.

Example 6

The transparent resin compositions (VI) (resin content: 10% by weight) were respectively obtained by adding 18 g of mix solvent comprised of 9 g of methanol and 9 g of nitromethane to 2 g of polyamide resins prepared in the above Synthetic Examples 1 to 7.

Example 7

The transparent resin compositions (VII) (resin content: 10% by weight) were respectively obtained by adding 18 g of mix solvent comprised of 9 g of propanol and 9 g of ethyl acetate to 2 g of polyamide resins prepared in the above Synthetic Examples 1 to 7.

Example 8

The transparent resin compositions (VIII) (resin content: 42% by weight) were respectively obtained by adding 2.8 g of mix solvent comprised of 1.4 g of methanol and 1.4 g of toluene to 2 g of polyamide resins prepared in the above Synthetic Examples 1 to 7.

Example 9

The transparent resin compositions (IX) (resin content: 10% by weight) were respectively obtained by adding 18 g of methyl cellsolve to 2 g of polyamide resins prepared in the above Synthetic Examples 1 to 7.

Example 10

The transparent resin compositions (X) (resin content: 10% by weight) were respectively obtained by adding 19.1 g of alkali aqueous solvent comprised of 0.1 g of sodium hydroxide, 9.5 g of methanol, and 9.5 g of water, to 1 g of polyamide resins prepared in the above Synthetic Examples 1 to 7.

Example 11

The transparent resin compositions (XI) (resin content: 5.5% by weight) were respectively obtained by adding 18.05 g of mixture solvent comprised of 0.05 g of tetramethylammonium hydroxide, 7.2 g of methanol, and 10.8 g of water to 1 g of polyamide resins prepared in the above Synthetic Examples 1 to 7.

Comparative Example 1

Chloroform, toluene, methyl ethyl ketone, nitromethane, and ethyl acetate were respectively added to polyamide resins prepared in the above Synthetic Examples 1 to 7. Polyamide resins were not perfectly dissolved in these solvents.

Example 12

Coats having uniform thickness of 30 microns were obtained by applying 10 g of the obtained resin compositions (I) to (XI) onto the base material comprised of glass, 20 cm×20 cm in size, and drying with heat for 1 hour, at 40° C., 60° C., 80° C., and 100° C. The obtained coats have good adhesiveness to the base materials.

Example 13

Polyamide resin composition (XIII) was obtained by adding and dissolving 1 g of polyamide resin prepared in Synthetic Example 1, 0.80 g of bisphenol A type epoxy compound (trade name: Epicoat 828, marketed by YUKA SHELL EPOXY CO., LTD.), and 0.02 g of triphenyl phosphine as a reaction accelerator to 4.6 g of mixture solvent comprised of 3.5 g of ethanol, 0.5 g of tetrahydrofuran, and 0.6 g of methyl ethyl ketone.

The coat was obtained by applying the obtained polyamide resin composition onto the base material comprised of glass, and drying it with heat for 2 hours at 120° C., and heating continuously for 2 hours at 180° C. for the crosslink. The dynamic modulus of elasticity of the obtained coat was measured using a measuring device (trade name: RHEO-2000, marketed by ORIENTEC CO., LTD.), and was 1.3× $10^{10}$ dyne/cm$^2$. Glass-transition temperature thereof was measured by thermal analytical device (trade name: ADS-100A, marketed by SHIMADU SEISAKUJYO CO., LTD), and was 223° C.

Example 14

Polyamide resin composition (XIV) was prepared in a manner identical to that of Example 13, except that 1 g of polyamide resin prepared in Synthetic Example 1, 0.80 g of bisphenol A type epoxy compound (trade name: Epicoat 828, marketed by YUKA SHELL EPOXY CO. LTD.), and 4.6 g of a mixture of solvents comprised of 3.5 g of ethanol, 0.5 g of tetrahydrofuran, and 0.6 g of methyl ethyl ketone were respectively replaced with 1 g of polyamide resin prepared in Synthetic Example 4, 0.66 g of biphenyl type epoxy compound (trade name: YX-4000IT, marketed by YUKA SHELL EPOXY CO. LTD.) and 5.65 g of a mixture of solvents comprised of 2.0 g of methanol and 3.65 g of tetrahydrofuran.

The coats were obtained by applying the polyamide resin composition prepared onto the base material comprised of glass, and drying it with heat for 2 hours, at 120° C., and heating continuously for 2 hours at 180° C. for the crosslink. The dynamic modulus of elasticity of the obtained coat was measured using a measuring device (trade name: RHEO-2000, marketed by ORIENTEC CO., LTD.), and was 3.4× $10^{10}$ dyne/cm$^2$. Glass-transition temperature thereof was measured by a thermal analytical device (trade name: ADS-100A, marketed by SHIMADU SEISAKUJYO CO., LTD), and was 248° C.

Comparative Example 2

The coat A prepared by heating 1.00 g of bisphenol A type epoxy compound (trade name: Epicoat 828, marketed by YUKA SHELL EPOXY CO. LTD.) to 120° C., adding 0.345 g of bis(4-aminophenyl) sulfone to the melted bisphenol A type epoxy compound, applying the obtained solution to a glass base material, and heating it for 2 hours at 150° C., and continuously for 2 hours at 180° C.

The coat B prepared by dissolving 1.00 g of biphenyl type epoxy compound (trade name: YX-4000IT, marketed by YUKA SHELL EPOXY CO. LTD.), 0.70 g of phenol novolack resin, and 0.017 g of triphenyl phosphine as a reaction accelerator to 8.8 g of N,N-dimethylformamide, applying the obtained solution onto a glass base material, drying it at 80° C., and heating it for 2 hours at 150° C. and continuously for 2 hours at 180° C.

The dynamic modulus of elasticity and glass-transition temperature of prepared coats A and B were measured using a measuring device (trade name: LEOVIVLON DDV-II, marketed by ORIENTEC CO., LTD.). The dynamic modulus of elasticity (dyne/cm$^2$) of the obtained coats A and B were 1.3×$10^{10}$, 0.8×$10^{10}$. Glass-transition temperatures thereof were measured by a thermal analytical device (trade name: ADS-100A, marketed by SHIMADU SEISAKUJYO CO., LTD), and were respectively 180° C., 190° C.

It was confirmed by these results that the coats comprised of polyamide resin compositions which denaturated by epoxy resin prepared by Examples 13 and 14 have high heat resistances, since Tg were high, and have the dynamic modulus of elasticities thereof.

Example 15

Polyamide resin composition (XV) was prepared by dissolving 2 g of polyamide resin prepared in Synthetic Example 4, and 0.302 g (0.876 milli mole) of diphenylmethane-bis(4-ethylene urea), which is a blocking isocyanate, to 25 g of the mixture solvent comprised of ethanol and ethyl methyl ketone at a weight ratio of 1:1.

The coats were obtained by coating the polyamide resin composition (XV) prepared onto a glass base material, removing the solvent under vacuum, and causing a reaction between the phenolic hydroxyl group of the polyamide resin and the isocyanate group.

When the obtained coat was heated for 4 hours at 200° C., separation between glass base material and the coat did not occur. Therefore, it was confirmed that the coat of Example 15 exhibits good adhesiveness.

Moreover, it was confirmed that the coat exhibits a high anti-solubility to N,N-dimethylformamide solvent, because the coat was not dissolve when the coat was immersed into N,N-dimethylformamide solvent.

Example 16

Polyamide resin composition (XVI) was prepared by dissolving 2 g of polyamide resin prepared in Synthetic Example 2, and 0.338 g (0.796 milli mole) of methyloxime block of 4,4'-diisocyanate-3,3'-diphenylmethane to 25 g of a mixture solvent comprised of ethanol and ethyl methyl ketone at a weight ratio of 1:1.

The coat was prepared in a manner identical to that of Example 15, except that the glass base material was replaced by an aluminum base material.

When the obtained coat was heated for 4 hours at 200° C., separation between the aluminum base material and the coat did not occur. Therefore, it was confirmed that the coat of Example 16 exhibits good adhesive properties.

Moreover, it was confirmed that the coat exhibits high anti-solubility to N,N-dimethylformamide solvent, because the coat did not dissolve when the coat was immersed into N,N-dimethylformamide solvent.

Example 17

Polyamide resin composition (XVII) was prepared by dissolving 2 g of polyamide resin prepared in Synthetic Example 1 to 25 g of a mixture solvent. The mixture solvent is comprising 6.02 g of 40% methanol aqueous solution (pH: 10, controlled by sodium hydroxide) and 18.98 g of 20% polyvinyl alcohol aqueous solution (trade name: CURARE PVA-117H, marketed by CURARE CO. LTD., saponification value: 99.3%).

The transparent coat comprised of the obtained polyamide resin composition (XVII) was coated onto a glass base material, and was dried it with heat at 60° C. The obtained coat was a composite comprised of polyvinyl alcohol and polyamide resin (A).

Example 18

Polyamide resin composition (XVIII) was prepared by adding 0.5 g of triglycydyl tris(2-dihydroxyethyl) isocyanate (marketed by NAGASE KASEI INDUSTRY CO. LTD.) to 27 g of the polyamide resin composition (XVII).

The transparent coat comprised of the obtained polyamide resin composition (XVIII) was coated onto a glass base material, drying it with heat at 60° C., and heating to 180° C. so as to form crosslinks. The obtained coat was a composite coat comprised of polyvinyl alcohol and polyamide resin (A), and had a glass-transition temperature of 175° C., which was measured by a thermal analytical device (trade name: ADS-100A, marketed by SHIMAZU SEISAKUJYO).

Example 19

Photosensitive polyamide resin composition (XIX) was prepared by dissolving 2 g of polyamide resin prepared in Synthetic Example 1 and 0.4 g of ester compound comprised of 2,3,4,4'-tetrahydroxybenzophenone and 1,2-naphthoquinone-2-diazide-5-sulfonate to 10 g of N,N-dimethylformamide, and filtering the obtained solution with filter of 0.2 μm-size.

The layer comprised of photosensitive polyamide resin (XIX) was prepared by spin coating the obtained photosensitive polyamide resin composition (XIX) onto a glass base material, and prebaking it under vacuum conditions, for 1 hour at 70° C. The obtained layer was 1.0 μm thick. Then, the pattern was prepared by exposing the obtained layer with KrF EXIMA STEPPER (NA 0.45), baking it for 5 minutes at 120° C. using a hot plate, immersing it in an alcohol aqueous mixture solvent comprised of 150 g of methanol, 350 g of water, and 5 g of sodium hydroxide, and then developing, washing with water, and drying.

When the sectional shape of the obtained pattern was observed by a scanning electron microscope, it was confirmed that the patterns having a width of 2 μm and sharp edges were obtained. Moreover, when the patterned layer was heated to 200° C., no changes in the shape and color occurred.

Example 20

The pattern comprised of photosensitive polyamide resin (XX) was prepared in a manner identical to that of Example 19, except that polyamide resin prepared in Synthetic Example 1 was replaced by polyamide resin prepared in Synthetic Example 2.

When the sectional shape of the obtained pattern was observed by scanning electron microscope, it was confirmed that the patterns having widths of 3 μm and sharp edges were obtained. Moreover, when the patterned layer was heated to 200° C., no changes in the shape and color occurred.

Example 21

The pattern comprised of photosensitive polyamide resin (XXI) was prepared in a manner identical to that of Example 19, except that polyamide resin prepared in Synthetic Example 1 was replaced by polyamide resin prepared in Synthetic Example 4.

When the sectional shape of the obtained pattern was observed by scanning electron microscope, it was confirmed that the patterns having widths of 2 μm and sharp edges were obtained. Moreover, when the patterned layer was heated to 200° C., no changes in the shape and color occurred.

What is claimed:

1. A polyamide resin comprising:
   a diamine component comprised of at least 50% by mole based on the total diamine component of diamine having diphenylmethane structure substituted by alkyl groups, indicated by the following Formula 1, and
   a dicarboxylic acid component comprised of at least 50% by mole based on the total dicarboxylic acid component of aromatic dicarboxylic acid having phenolic hydroxyl groups, indicated by the following Formula 2,

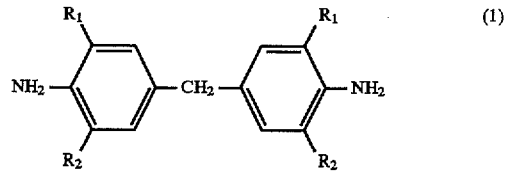

(1)

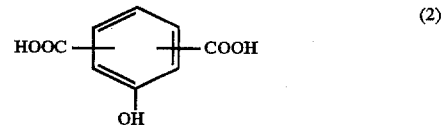

(2)

wherein, $R^1$ and $R^2$ are groups or atoms selected from the group consisting of a hydrogen atom, a methyl group, an ethyl group, a propyl group, and an isopropyl group, and wherein $R^1$ and $R^2$ are not both hydrogen atoms.

2. A polyamide resin composition in which polyamide resin according to claim 1 is dissolved in an alcohol solvent.

3. A polyamide resin composition in which polyamide resin according to claim 1 is dissolved in a mixture of solvent comprising an alcohol solvent and non-amide containing organic solvent.

4. A polyamide resin composition in which polyamide resin according to claim 1 is dissolved in an alcohol solvent having straight chain and ether bonds in its structure.

5. A polyamide resin composition in which polyamide resin according to claim 1 is dissolved in an alkali aqueous solvent containing alcohol having 1 to 5 carbon atoms.

6. A coated article comprising a substrate and the polyamide resin composition according to one of claims 2 to 5, which has been dried.

7. A polyamide resin composition at least comprised of polyamide resin according to claim 1 and epoxy compounds having at least two epoxy groups in their structures.

8. A coated article comprising a base material and a coating which is prepared by the steps of:

coating the polyamide resin composition according to claim 7 onto a base material, drying it, and reacting hydroxyl groups of polyamide resin and epoxy groups of epoxy compounds.

9. A polyamide resin composition at least comprising polyamide resin according to claim 1 and blocking isocyanate compound having at least two blocked isocyanate groups in the structure.

10. A coated article comprising a base material and a coating prepared by the steps of:

coating the polyamide resin composition according to claim 9 onto a base material, drying it, and reacting hydroxyl groups of polyamide resin and isocyanate groups of the blocking isocyanates.

11. A polyamide resin composition at least comprising polyamide resin according to claim 1 and water soluble resins having hydroxyl groups.

12. A coated article comprising a substrate and the polyamide resin composition according to claim 11, which has been dried.

13. A polyamide resin composition at least comprised of polyamide resin according to claim 1, water soluble resins having hydroxyl groups, and water soluble epoxy compounds having at least two epoxy groups in their structures.

14. A coated article comprising a base material and a coating prepared by the steps of:

coating the polyamide resin composition according to claim 13 onto a base material, drying it, and crosslinking the polyamide resin and the water soluble resin by a water soluble epoxy resin having at least two epoxy groups in their structure.

* * * * *